United States Patent
Tingwu et al.

(10) Patent No.: US 7,809,086 B2
(45) Date of Patent: Oct. 5, 2010

(54) APPARATUS AND METHODS FOR DEMODULATING A SIGNAL

(75) Inventors: Wang Tingwu, Singapore (SG); Pan Ju Yan, Singapore (SG); Yu Yang, Singapore (SG); Hu Saigui, Singapore (SG); Tomisawa Masayuki, Singapore (SG)

(73) Assignee: Oki Techno Centre (Singapore) Pte Ltd, Singapore (SG)

( * ) Notice: Subject to any disclaimer, the term of this patent is extended or adjusted under 35 U.S.C. 154(b) by 597 days.

(21) Appl. No.: 11/836,141

(22) Filed: Aug. 8, 2007

(65) Prior Publication Data
US 2008/0061870 A1 Mar. 13, 2008

(30) Foreign Application Priority Data
Sep. 12, 2006 (SG) .............................. 200606232-7

(51) Int. Cl.
*H03K 9/00* (2006.01)
*H04L 27/00* (2006.01)

(52) U.S. Cl. .................. 375/316; 375/272; 375/273; 375/282; 375/283; 375/329; 375/330; 329/300; 329/304

(58) Field of Classification Search ......... 375/272–283, 375/329–337, 316; 329/300–310
See application file for complete search history.

(56) References Cited

U.S. PATENT DOCUMENTS 6,639,939 B1 * 10/2003 Naden et al. ................ 375/140

* cited by examiner

*Primary Examiner*—Curtis B Odom
(74) *Attorney, Agent, or Firm*—Rabin & Berdo, P.C.

(57) ABSTRACT

An apparatus for demodulating an analogue input signal comprises a hard limiter stage (4) for converting the signal to a two level signal. A digital down converter/low pass filter stage (6) converts the signal to a base band signal, and a symbol synchronization stage (8) extracts symbol timing. An instantaneous phase detector (10) calculates the instantaneous phase of the one or more symbols associated with the input signal. If the input signal has been modulated according to a pi/4DQPSK, pi/2DBPSK, GMSK, or a GFSK modulation scheme, a differential detector (12) determines a difference in the phase between adjacent symbols, a coarse frequency offset compensation stage (14) applies a compensation signal to compensate for frequency offset, and a frequency offset estimation stage (16) updates this compensation signal. A demapper (18) generates a demodulated output signal after compensation by the frequency offset compensation stage.

20 Claims, 8 Drawing Sheets

APPARATUS AND METHODS FOR DEMODULATING A SIGNAL

BACKGROUND OF THE INVENTION

1. Field of the Invention

The present invention relates to apparatus and methods for demodulating a modulated signal, for example, according to one or more of a π(pi)/4 differential quaternary phase shift keying (DQPSK) modulation scheme, a pi/2 differential-binary phase-shift keying (DBPSK) modulation scheme, a Gaussian minimum shift keying (GMSK) modulation scheme, a Gaussian Frequency-Shift Keying (GFSK) modulation scheme, a Differential M-ary Phase Shift Keying (DMPSK) modulation scheme or an M-ary Phase Shift Keying (MPSK) modulation scheme.

2. Description of Related Art

M-ary Phase Shift Keying (MPSK) and Differential M-ary Phase Shift Keying (DMPSK) are widely used in wireless communication and satellite communication. In MPSK modulation scheme, the phase of the current symbol is switched among M values according to the modulated binary input signal to be transmitted. In DMPSK modulation scheme, the difference between the phase of the current symbol and that of the preceding symbol in a transmitted signal is based on the modulated binary input signal. Both MPSK and DMPSK are linear modulation techniques and the modulated symbols are conventionally pulse shaped by a linear finite impulse response (FIR) filter which commonly uses a squared root raised cosine (RRC) filter or a raised cosine filter (RC). MPSK and DMPSK techniques have many variations such as BPSK, QPSK, 8PSK, DBPSK, DQPSK, pi/2 DBPSK, pi/4 DQPSK and Offset QFSK.

In traditional demodulators for MPSK and DMPSK signals, an analogue to digital converter (ADC) is used to convert the received analogue signal (either a baseband signal or an intermediate frequency (IF) signal) into digital form for further processing. For digital processing, the signal is passed through a matched filter, such as an RRC filter, and is then applied to a timing synchronization stage. For MPSK signals, either a voltage-controlled oscillator (VCO) or a Numerically Controlled Oscillator is used to track the carrier phase and frequency. For DPSK signals, a differential detector which consists of four multipliers is used to extract the phase difference between two consecutive symbols. One drawback of this arrangement is that analogue-to-digital conversion typically consumes a large amount of power. Another drawback is that the Radio Frequency (RF) front end of the receiver requires Automatic Gain Control (AGC). A further disadvantage is that the inclusion of a VCO or an NCO is inherently complex, requiring large and expensive circuit configurations. In such conventional processes, it is also necessary to normalize the received in-phase (I) and quadrature (Q) signals to determine the decision thresholds for phase measurement.

Attempts have been made to circumvent these problems. U.S. Pat. No. 5,574,399 adopts a hard limiter to replace analogue-to-digital conversion and the instantaneous phase of the received PSK signal is detected with reference to the un-modulated carrier signal. The phase rotation due to frequency offset between the two IF signals is detected and removed from the instantaneous phase signal. A remaining phase offset is then detected and removed. Data are recovered from the resulting instantaneous phase signal.

Other patents such as U.S. Pat. Nos. 3,997,847, 5,122,758, 5,539,776, 5,640,427, 5,945,875, 5,574,399 and 5,668,838 also disclose replacing analogue to digital conversion with a hard limiter. In these processes a very high sampling rate is required to deal with the differential detection, whereas, in digital processing systems, a simple correlation and a counter are commonly used for the phase detector. Furthermore, there are a number of other disadvantages in the above-mentioned methods which use a hard limiter, and these include a serious performance degradation relative to other conventional methods in which an analogue to digital conversion takes place. Also, these methods are primarily used for dealing with pi/4 DQPSK modulation which uses little power and is insensitive to the nonlinearity in the RF components. However, in conventional MPSK and DPSK techniques, such as D8PSK modulation, the signal may go through the origin at the constellation, and is much more sensitive to the non-linearity introduced by power amplifier, mixers, narrow band pass IF filter and limiter. Thus, the performance of a D8PSK demodulator could deteriorate and such a demodulator would require good linear characteristics for the RF front end components, especially for strong input signals. Those apparatus using coherent detection require more accurate frequency offset estimation than those using differential detection.

Thus there is a need for apparatus and methods which substantially overcome or at least ameliorate some or all of the abovementioned disadvantages.

SUMMARY OF THE INVENTION

An object of the present invention is to provide apparatus and methods for demodulating modulated signals which have been modulated according to one or more of a number of modulation schemes and which uses a hard limiter stage to convert an incoming analogue signal to a two level signal.

According to a first aspect of the present invention there is provided an apparatus for demodulating a signal modulated according to any one or more of a pi/4DQPSK modulation scheme, a pi/2DBPSK modulation scheme, a GMSK modulation scheme, and a GFSK modulation scheme. The apparatus comprises a hard limiter stage for receiving an analogue input signal modulated with one or more symbols and for converting the input signal to a two level signal; a digital down converter and low pass filter stage for receiving an output signal from the hard limiter stage and converting the signal to a base band signal; a symbol synchronization stage for receiving an output signal from the digital down converter and low pass filter stage and for extracting symbol timing therefrom, the one or more symbols associated with the input signal each having an associated phase; an instantaneous phase detector stage for receiving an output signal from the symbol synchronization stage and for calculating the instantaneous phase of the one or more symbols; a differential detector stage for receiving an output signal from the instantaneous phase detector stage and for determining a difference in the phase between adjacent symbols; a coarse frequency offset compensation stage for receiving an output signal from the differential detector stage and for applying a compensation signal to the output signal of the differential detector stage to compensate for the effects of frequency offset between a transmitter of the input signal and a receiver receiving the input signal applied to the apparatus; a frequency offset estimation stage for receiving an output signal from the coarse frequency offset compensation stage and for estimating a residual frequency offset after application of the compensation signal, the frequency offset estimation stage being arranged to apply the estimated residual frequency offset to the coarse frequency offset compensation stage to update the frequency offset compensation signal; and a demapper stage for demodulating the output signal of the differential detector stage after compensation by the frequency offset compensation stage to generate a demodulated output signal.

Preferably, the digital down converter and low pass filter stage comprises a buffer, the buffer being arranged to act as a signal delay prior to digital down conversion by the digital down converter and low pass filter stage.

In a preferred embodiment, the symbol synchronization stage is arranged to apply a discrete Fast Fourier Transform process for extracting the symbol timing.

Preferably, the instantaneous phase detector stage is arranged to calculate the instantaneous phase of the one or more symbols based on inphase and quadrature components of the input signal.

According to a second aspect of the present invention there is provided an apparatus for demodulating a signal modulated according to a DMPSK or an MPSK modulation scheme. The apparatus comprises a hard limiter stage for receiving an analogue input signal modulated with one or more symbols and for converting the input signal to a two level signal; a digital down converter and low pass filter stage for receiving an output signal from the hard limiter stage and converting the signal to a base band signal; a symbol synchronization stage for receiving an output signal from the digital down converter and low pass filter stage and for extracting symbol timing therefrom, the one or more symbols associated with the input signal each having an associated phase; an instantaneous phase detector stage for receiving an output signal from the symbol synchronization stage and for calculating the instantaneous phase of the one or more symbols; a fine frequency offset compensation stage for receiving an output signal from the instantaneous detector stage and for applying a frequency compensation signal to the output signal of the instantaneous detector stage to compensate for the effects of frequency offset between a transmitter of the input signal and a receiver receiving the input signal applied to the apparatus; a phase offset compensation stage for receiving an output signal from the fine frequency offset compensation stage and for applying a phase compensation signal to the frequency compensated signal; a dynamic phase offset estimation stage for receiving an output signal from the phase offset compensation stage and being arranged to apply an estimated phase offset to the phase offset compensation stage to update the phase offset compensation signal; and a demapper stage for demodulating the signal after compensation by the frequency offset compensation stage and phase offset compensation stage to generate a demodulated output signal.

Preferably, the demapper stage comprises an MPSK demapper stage.

In a preferred embodiment, the apparatus further comprises a DMPSK decoder stage for receiving an output signal from the demapper stage and arranged to decode the output signal according to a DMPSK demapping scheme if the input signal has been modulated according to a DMPSK modulation scheme.

According to a third aspect of the present invention there is provided an apparatus for demodulating a signal modulated according to any one or more of a pi/4DQPSK modulation scheme, a pi/2DBPSK modulation scheme, a GMSK modulation scheme, a GFSK modulation scheme, a DMPSK modulation scheme or an MPSK modulation scheme. The apparatus comprises the apparatus defined above according to a first aspect of the present invention for demodulating a signal modulated according to any one or more of a pi/4DQPSK modulation scheme, a pi/2DBPSK modulation scheme, a GMSK modulation scheme, and a GFSK modulation scheme; and the apparatus defined above according to a second aspect of the present invention for demodulating a signal modulated according to any one or more of a DMPSK modulation scheme or an MPSK modulation scheme.

According to a fourth aspect of the present invention there is provided a method for demodulating a signal modulated according to any one or more of a pi/4DQPSK modulation scheme, a pi/2DBPSK modulation scheme, a GMSK modulation scheme, and a GFSK modulation scheme. The method comprises receiving an analogue input signal modulated with one or more symbols; converting the input signal to a two level signal in a hard limiter stage; applying an output signal from the hard limiter stage to a digital down converter and low pass filter stage and converting the signal to a base band signal; applying an output signal from the digital down converter and low pass filter stage to a symbol synchronization stage and extracting symbol timing therefrom, the one or more symbols associated with the input signal each having an associated phase; applying stage an output signal from the symbol synchronization stage to an instantaneous phase detector and calculating the instantaneous phase of the one or more symbols; applying an output signal from the instantaneous phase detector stage a differential detector and determining a difference in the phase between adjacent symbols; applying an output signal from the differential detector stage to a coarse frequency offset compensation stage arranged to generate and apply a compensation signal to the output signal of the differential detector stage to compensate for the effects of frequency offset between a transmitter of the input signal and a receiver receiving the input signal applied to the apparatus; applying an output signal from the coarse frequency offset compensation stage to a frequency offset estimation stage and estimating using the frequency offset estimation stage a residual frequency offset after application of the compensation signal; applying the estimated residual frequency offset to the coarse frequency offset compensation stage to update the frequency offset compensation signal; and demodulating in a demapper stage the output signal of the differential detector stage after compensation by the frequency offset compensation stage to generate a demodulated output signal.

Preferably, the step of applying an output signal from the hard limiter stage to the digital down converter and low pass filter stage comprises delaying the signal in a buffer prior to digital down conversion by the digital down converter and low pass filter stage.

Preferably, the step of calculating the instantaneous phase of the one or more symbols in the symbol synchronization stage comprises applying a discrete Fast Fourier Transform process for extracting the symbol timing.

In a preferred embodiment, the step of calculating the instantaneous phase of the one or more symbols comprises basing the calculation on inphase and quadrature components of the input signal.

According to a fifth aspect of the present invention there is provided a method for demodulating a signal modulated according to a DMPSK or an MPSK modulation scheme. The method comprises receiving an analogue input signal modulated with one or more symbols; converting the input signal to a two level signal using a hard limiter stage; applying an output signal from the hard limiter stage to a digital down converter and low pass filter stage and converting the signal to a base band signal; applying an output signal from the digital down converter and low pass filter stage to a symbol synchronization stage and extracting symbol timing therefrom, the one or more symbols associated with the input signal each having an associated phase; applying an output signal from the symbol synchronization stage to an instantaneous phase detector stage and calculating the instantaneous phase of the one or more symbols; applying an output signal from the instantaneous detector stage to a fine frequency offset compensation stage and applying a frequency compensation signal to the output signal of the instantaneous detector stage to compensate for the effects of frequency offset between a transmitter of the input signal and a receiver receiving the input signal applied to the apparatus; applying an output signal from the fine frequency offset compensation stage to a phase offset compensation stage and applying a phase compensation signal to the frequency compensated signal; applying an output signal from the phase offset compensation stage to a dynamic phase offset estimation stage and applying an estimated phase offset to the phase offset compensation stage to update the phase offset compensation signal; and demodulating in a demapper stage the signal after compensation by the frequency offset compensation stage and phase offset compensation stage to generate a demodulated output signal.

Preferably, the step of demodulating comprises demodulating the signal in an MPSK demapper stage.

In a preferred embodiment, the method further comprises applying an output signal from the demapper stage to a DMPSK decoder stage and decoding the output signal according to a DMPSK demapping scheme if the input signal has been modulated according to a DMPSK modulation scheme.

According to a sixth aspect of the present invention there is provided an apparatus for demodulating a signal modulated according to any one or more of a pi/4DQPSK modulation scheme, a pi/2DBPSK modulation scheme, a GMSK modulation scheme, a GFSK modulation scheme, a DMPSK modulation scheme or an MPSK modulation scheme. the apparatus comprises apparatus arranged to apply the method defined above according to a fourth aspect of the present invention for demodulating a signal modulated according to any one or more of a pi/4DQPSK modulation scheme, a pi/2DBPSK modulation scheme, a GMSK modulation scheme, and a GFSK modulation scheme; and apparatus arranged to apply the method defined above according to a fifth aspect of the present invention for demodulating a signal modulated according to any one or more of a DMPSK modulation scheme or an MPSK modulation scheme.

DETAILED DESCRIPTION OF THE INVENTION

The preferred embodiment of the present invention will be described in detail by way of following examples and with reference to the above-mentioned figures.

Figure 1:
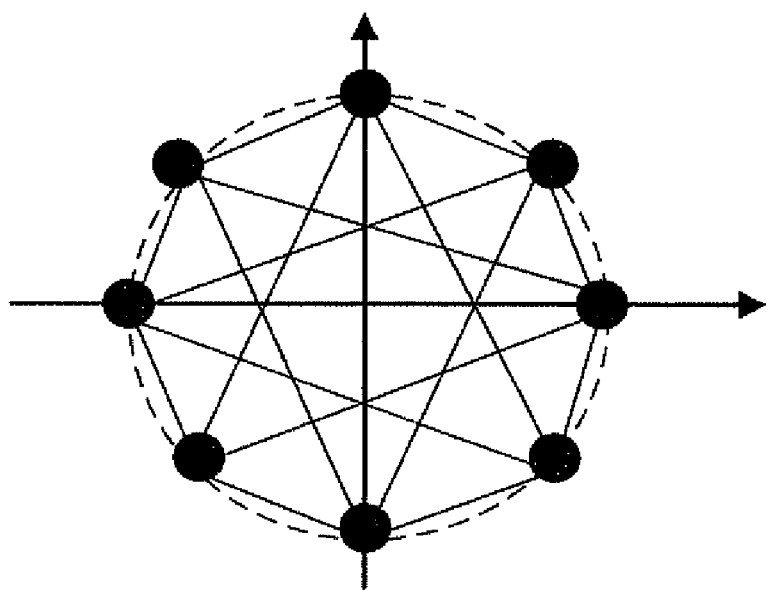
FIG. 1 is a schematic diagram showing a pi/4 DQPSK constellation.
Figure 2:
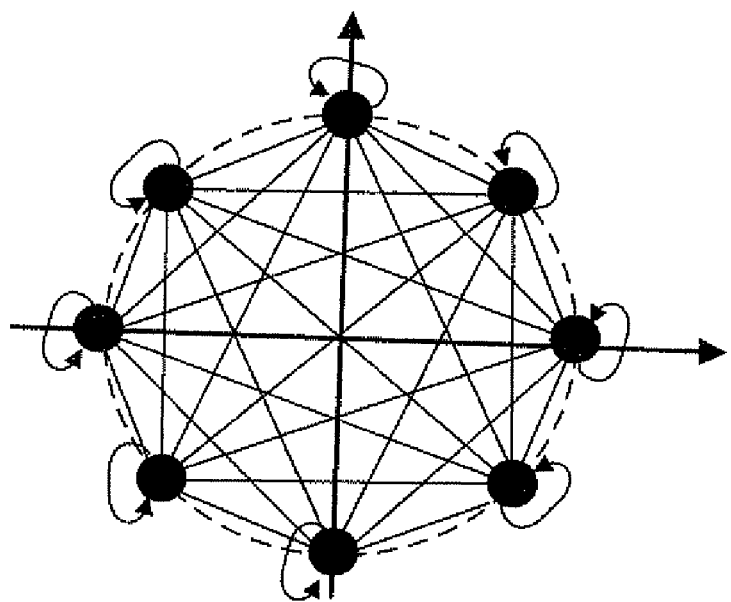
FIG. 2 is a schematic diagram showing a D8QPSK constellation.

FIG. 1 and FIG. 2 are schematic diagrams showing respectively a pi/4 DQPSK constellation for a modulation system in which the signal does not pass through the origin and a D8QPSK constellation for a modulation system in which the signal may pass through the origin. One or more preferred embodiments of the present invention is arranged to demodulate signals modulated according to one or other or both of the modulation systems illustrated in FIG. 1 and FIG. 2.

Figure 3:
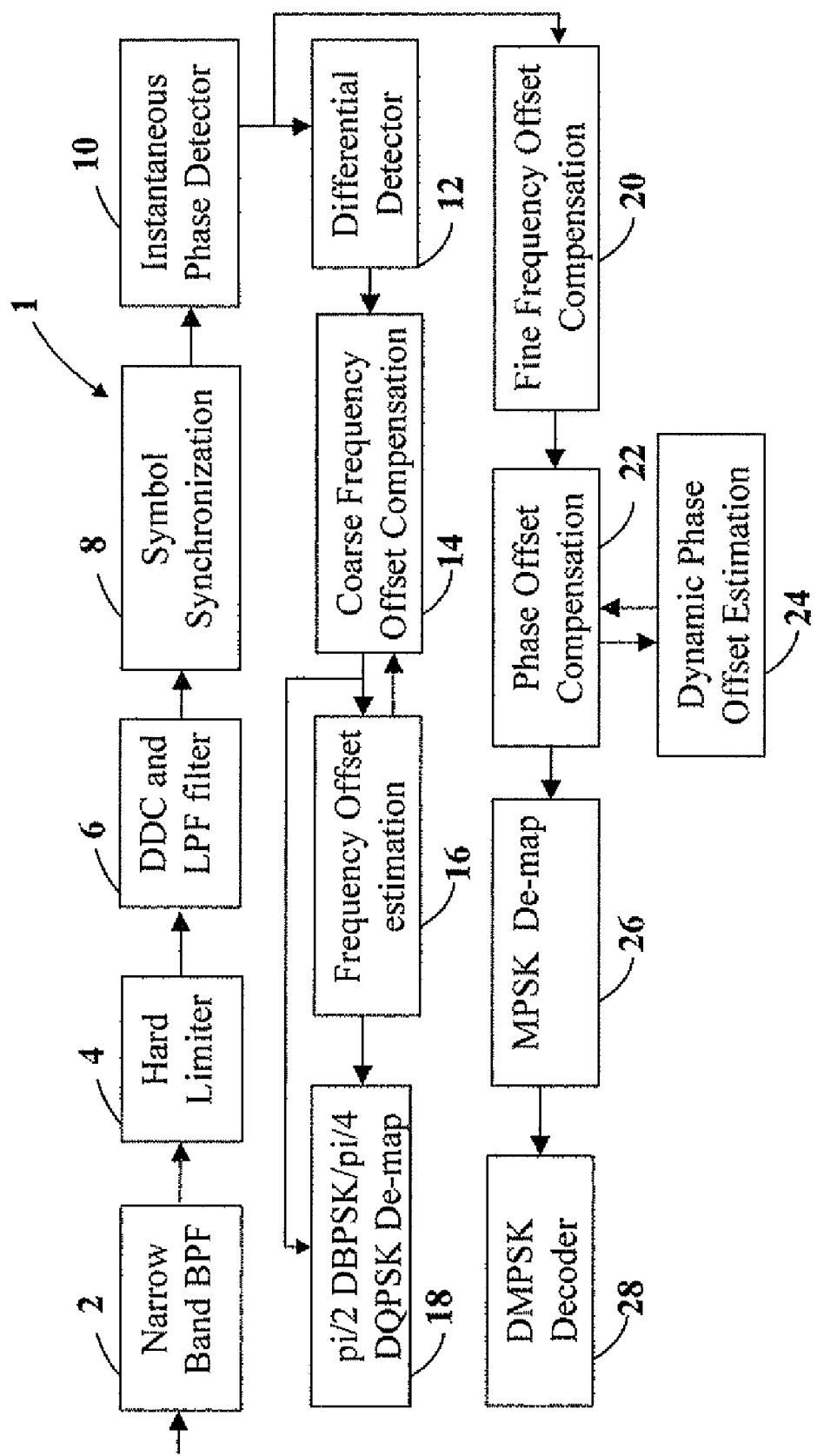
FIG. 3 is a block diagram showing a system according to a first preferred embodiment of the invention.

FIG. 3 shows an apparatus 1 according to a preferred embodiment of the present invention. In the apparatus 1, an incoming signal is applied to a narrow band pass filter 2 and the output of the filter 2 is applied to a hard limiter stage 4. The hard limiter stage 4 converts the incoming analogue signal to a two-level signal. The output IF signal of the hard limiter stage 4 is applied to the input of a digital down converter and low pass filter (DDC and LPF) stage 6 and the output of this stage 6 is applied to a symbol synchronization stage 8. The DDC and LPF stage 6 converts the IF signal to a base band signal and removes the harmonic components resulting from the nonlinearity of the hard limiter stage 4. The symbol synchronization stage 8 uses Discrete Fourier Transform techniques to extract the symbol timing and then selects the optimum samples at symbol rate. The synchronized signal output from the symbol synchronization stage 8 is applied to the input of an instantaneous phase detector (IPD) 10. The IPD 10 calculates the symbol phase from the input in phase and quadrature (I and Q) signal components through a simple divider (shown in FIG. 7) using six sequential subtractors and a look-up table (LUT, shown in FIG. 8).

If the incoming signal has been modulated according to a pi/2 DBPSK or a pi/4 DQPSK modulation scheme, the output signal of the instantaneous phase detector 10 is applied to a differential detector stage 12. The differential detector stage 12 uses a subtractor to implement the differential detection. The output of the differential detector stage 12 is then applied to a coarse frequency offset compensation stage 14 which compensates for the frequency offset present in the output of the differential detector stage 12. The output of the coarse frequency offset compensation stage 14 is applied to a frequency offset estimation stage 16 which estimates and updates the existing frequency offset. The output of the frequency offset estimation stage 16 is then applied to the coarse frequency offset compensation stage 14 and it is also applied to a pi/2 DBPSK and pi/4 DQPSK demapper stage 18 to demodulate the signal and provide an output signal. The output of the coarse frequency offset compensation stage 14 is also applied to the pi/2 DBPSK and pi/4 DQPSK demapper stage 18. In practice, the output of the frequency offset estimation stage 16 may preferably be used to correct a subsequent slot rather than be used immediately.

If the incoming signal has been modulated according to an MPSK or a DMPSK modulation scheme, the output from the instantaneous phase detector 10 is applied to a fine frequency offset compensation stage 20 which uses fine frequency offset to compensate the instantaneous phase. The output of the fine frequency offset compensation stage 20 is applied to a phase offset compensation stage 22 which is coupled to the input of a dynamic phase offset estimation stage 24. The phase offset compensation stage 22 rotates the symbols to the transmitted signal constellation. The output from the dynamic phase offset estimation stage 24 is applied to an MPSK demapper stage 26 which determines the transmitted symbols and the output of the MPSK demapper stage 26 is optionally applied to a DMPSK decoder/demapper stage 28 to produce the demodulated output signal. The phase ambiguity may be resolved by transmitting a specified code, for example, a unique word which can be recognized and decoded at the receiver. The DMPSK decoder/demapper stage 28 determines the transmitted differentially encoded symbols based on the symbols determined by the MPSK demapper stage 26.

In operation, the narrow band pass filter 2 functions to remove excess thermal noise and adjacent channel interference (ACI) from the input signal. The signal is then applied to the hard limiter stage 4 and the output hard-limited signal is processed digitally in the subsequent stages. The digital down converter (DDC) and Low Pass Filter (LPF) stage 6 converts the IF signal to a baseband signal and removes the high frequency components caused by the down converter 6 and the harmonic signals introduced by the hard limiter stage 4. The processed signal is then applied to the symbol timing synchronization stage 8 in which the frequency of the signal is reduced to the symbol rate at optimum decision timing as determined by the symbol timing synchronization stage 8. The instantaneous phase detector 10 maps the complex inphase and quadrature (I and Q) signal components to a phase which lies in the range of [0: 2pi].

For signals modulated according to pi/2 DQPSK and pi/4 DQPSK modulation schemes in which the signal does not pass through the origin at the constellation and in which the non-linearity of the narrow band pass filter 2 and the hard limiter 4 have less effect, the demodulator apparatus according to a preferred embodiment may only additionally require the differential detector stage 12, the coarse frequency offset compensation stage 14, the frequency offset estimation stage 16 and the symbol de-map stage 18. However, for signals modulated according to other modulation schemes in which the signal may pass through the origin at the constellation, a coherent demodulator structure consisting of the fine frequency offset compensation stage 20, the phase offset compensation stage 22, the dynamic phase offset estimation stage 24 and a stage 26 may be included. Furthermore, for signals modulated according to a DMPSK modulation scheme, the coherent demodulated signal is preferably passed through an extra differential decoder 28 to obtain the demodulated symbols.

Figure 4:
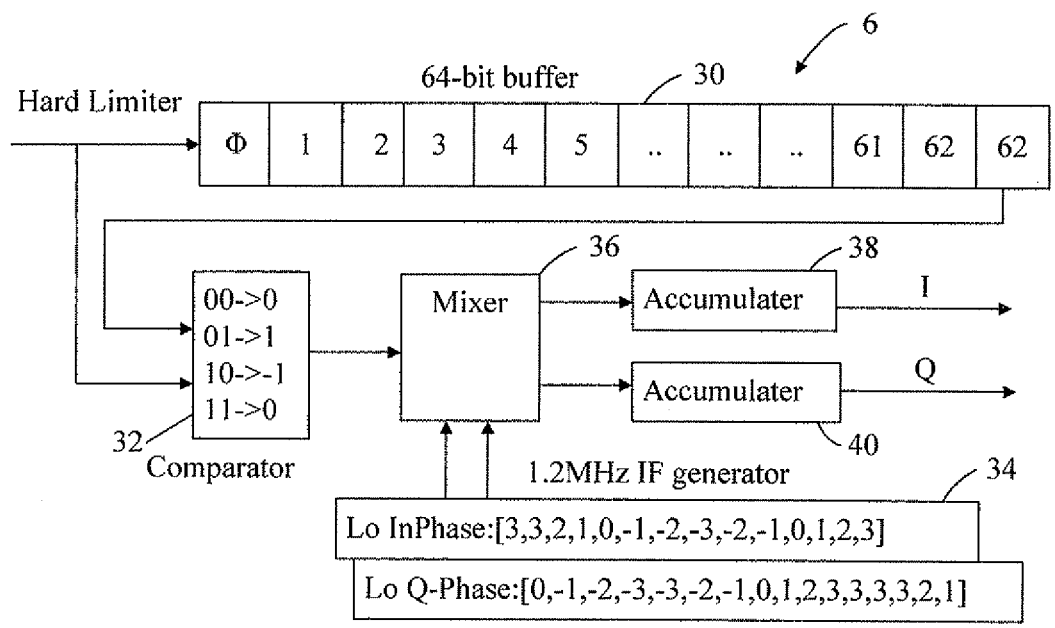
FIG. 4 is a block diagram of the digital down-converter and low pass filter stage of the system of FIG. 3.

As shown in FIG. 4, the DDC and LPF stage 6 may comprise a 64-bit buffer 30, a comparator 32, a 1.2 MHz frequency generator 34, a digital mixer 36 and two accumulators 38, 40. The signal output from the hard limiter stage 4, which is preferably at a first IF frequency of 19.2 MHz, is applied to the input of the 64 bit buffer stage 30 and is also applied to a first input of the comparator 32. The output of the 64 bit buffer 30 is applied to a second input of the comparator 32. As each sample of the incoming signal is received by the comparator 32, it is compared to a sample 64 samples ahead. The output signal from the comparator stage 32 is applied to the mixer stage 36 where it is mixed with two outputs from the 1.2 MHz frequency generator 34 which produces in-phase and quadrature signals. The mixer produces two output signals, one corresponding to the inphase component (I) and the other corresponding to the quadrature component (Q). The two components are accumulated in separate accumulators 38 and 40.

The 1.2 MHz frequency generator 34 produces a series of 4 bit serial codes at 1.2 MHz to be applied to the mixer to produce the inphase and quadrature components of the signals. The serial codes range from −3 to +3. This arrangement improves the symbol timing estimation and instantaneous phase calculation. By exchanging the application of the buffer with that of the DDC, this simplifies the structure of the DDC and the LPF stage 6 by taking advantage of the relationship of the number of taps of the LPF and the ratio of the first IF and the frequency of the frequency generator 34.

Figure 5:
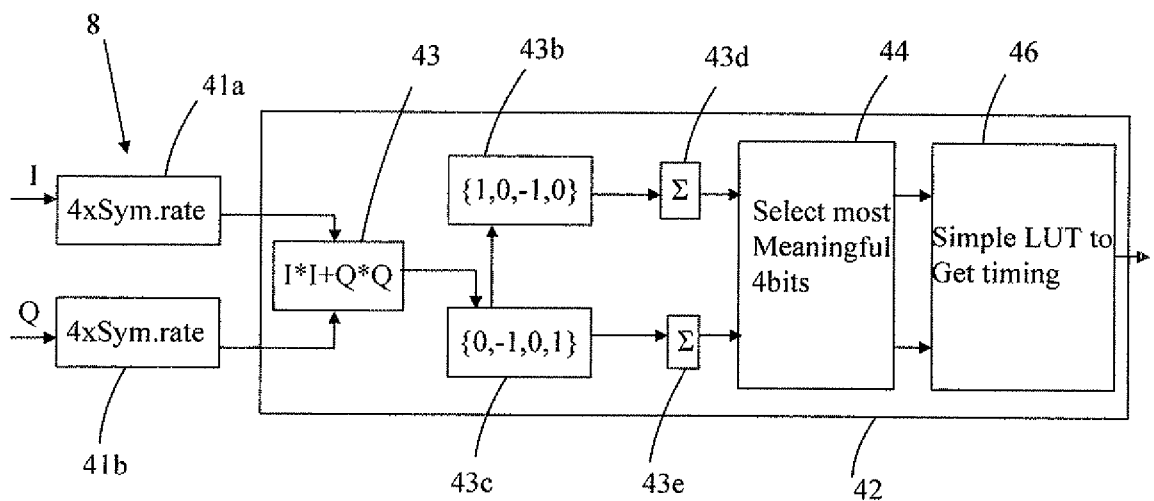
FIG. 5 is a block diagram of the symbol timing synchronization stage and the instantaneous phase detector of the system of FIG. 3.

As shown in FIG. 5, the Symbol Timing Synchronization stage 8 uses a Discrete Fourier Transform (DFT)-based timing estimation method to calculate the timing of the symbols and then reduces the high-input samples to one symbol rate. The high sampling rate (for example, 100× symbol rate) is preferably reduced to 4 times the symbol rate (simplified as 4×Sym.rate in FIG. 5) in in-phase and quadrature reduction stages 41a and 41b in order to avoid large data manipulation and to take advantage of the simple form of the relative symbol frequency as {1,0,−1,0} and {0,−1,0,1}. The inphase and quadrature signals in 4 bit form are applied to a DFT stage 42. The DFT stage 42 comprises a squarer stage (I*I+Q*Q)43 and the resultant output from the squarer stage 43 is applied to a pair of multiplier stages({1,0,−1,0} {0,−1,0,1})43b and 43c, one of which multiplies the output from the squarer stage 43 by cos(2*pi*n/samples-per-symbol) and the other of which multiplies the output from the squarer stage by sin (2*pi*n/samples-per-symbol), where n=0,1,2,3, . . . and samples_per_symbol in this example is 4. The outputs of the multiplier stages 43b and 43c are summed in a pair of summation stages (Σ) 43d and 43e and the summed outputs are truncated by a normalizer 44 which selects the most meaningful 4 bits which is then applied as an address to a phase lookup table (LUT) 46. The output of the lookup table 46 is the timing offset error. This timing offset error may be used for interpolation of the 100× samples to obtain a time offset adjusted 1× sample.

Figure 6:
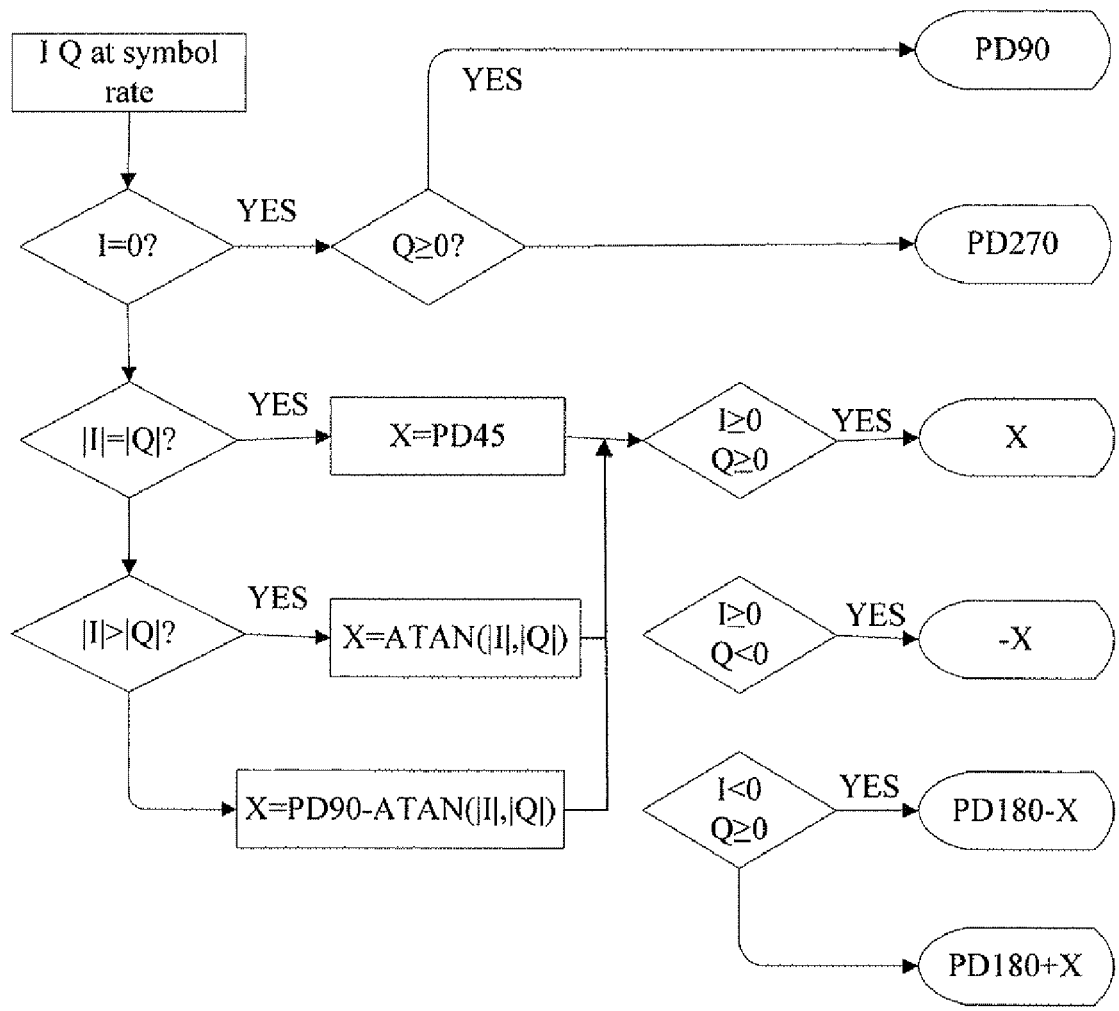
FIG. 6 is a flow diagram of the instantaneous phase detector of the system of FIG. 3.

The Instantaneous Phase Detector 10, the operation of which is shown in more detail in FIG. 6, is arranged to calculate the instantaneous symbol phase based on I and Q values and to map the phase from 0-2pi to a fill range 0-2$^m$ where, m is an integer, e.g. m=9. By so doing, the modulus 2pi problem is solved and all of the subsequent operations may be carried out using adder operations. The table below gives an example of phase representation by 9 bits.

| 0° (360°) | 9'b000000000 | PD0 (PD360) |
|---|---|---|
| 22.5° | 9'b000100000 | PD22_5 |
| 45° | 9'b001000000 | PD45 |
| 90° | 9'b010000000 | PD90 |
| 135° | 9'b011000000 | PD135 |
| 180° | 9'b100000000 | PD180 |
| 225° | 9'b101000000 | PD225 |
| 270° | 9'b110000000 | PD270 |
| 315° | 9'b111000000 | PD315 |

FIG. 6 is a flow diagram illustrating the operation of the Instantaneous Phase Detector. The inphase and quadrature components (I and Q) are examined at the symbol rate. If the I component is zero, and the Q component is greater than or equal to zero, the phase is at 90 degrees. If, however, the Q component is less than zero, the phase is at 270 degrees. If the I component is not zero, but the modulus of the I component is equal to the modulus of the Q component, then the phase of the transmitted signal relative to the reference clock (x) is 45 degrees. If the modulus of the I component is greater than the modulus of the Q component, then x is equal to the arctangent given by the modulus of the I component and the modulus of the Q component. If the modulus of the I component is not greater than the modulus of the Q component, then x is given by {90−arctan (|I|, |Q|)}.

If the I and Q components are both greater than or equal to zero, then the phase angle is given by x. If the I component is greater than or equal to zero and the Q component is less than zero then the phase angle is given by {−x}. If the I component is less than zero and the Q component is greater than or equal to zero then the phase angle is given by {180−x}. If none of the above conditions apply, then the phase is given by {180+x}.

Figure 7:
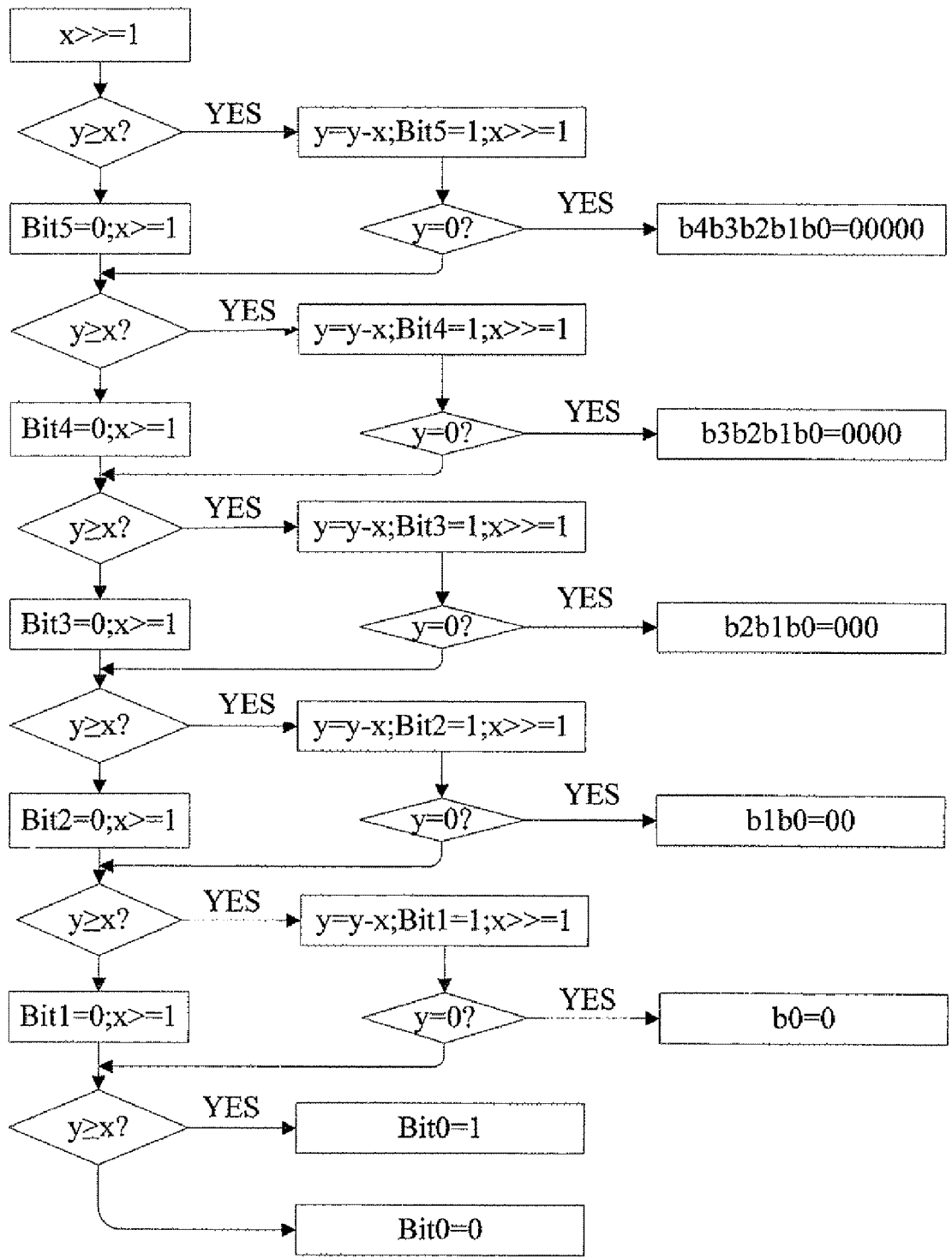
FIG. 7 is a flow diagram of a divider for use in the instantaneous phase detector of FIG. 6.

A 6-bit output divider is used to calculate the phase range [0, pi/8] and this is realized by a plurality of sequential subtractors as illustrated in FIG. 7. In each subtractor stage, the inphase and quadrature outputs (x and y respectively) from the summation stages 43d and 43e of FIG. 5 are operated upon in the manner shown in FIG. 7. FIG. 7 is a divider implementation where y/x is computed by adding LSB (least significant bit)=0 to y and removing one LSB from x. For example, for x=9, y=6: the 1st MSB (most significant bit) of y/x is 0, since 6<9; the 2nd MSB of y/x is 1, since 6≧4; the 3rd MSB of y/x is 1, since 2≧2. At this point, y=x (2=2), so the rest of the bits are 0. The final result is y/x=011000 in binary where 11000 is the fractional part. The subtraction is performed by adding the 2's complements.

Figure 8:
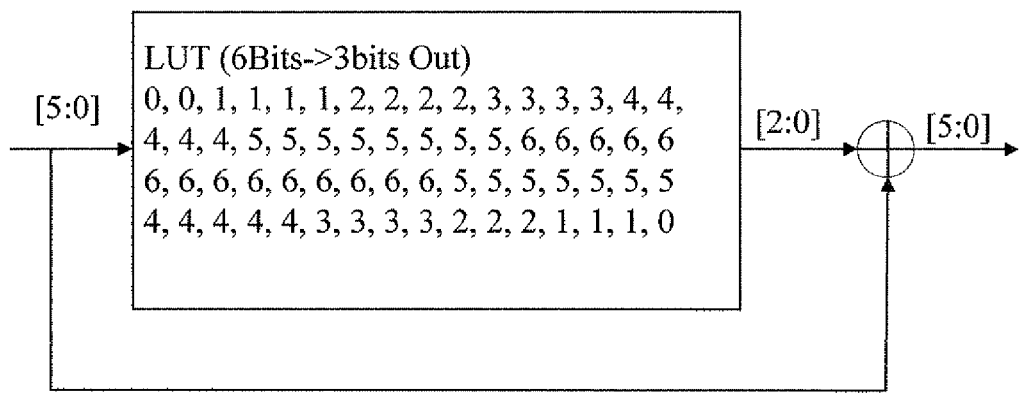
FIG. 8 is a block diagram of the look-up table for the instantaneous phase detector of FIG. 6.
Figures 9A, 9B:
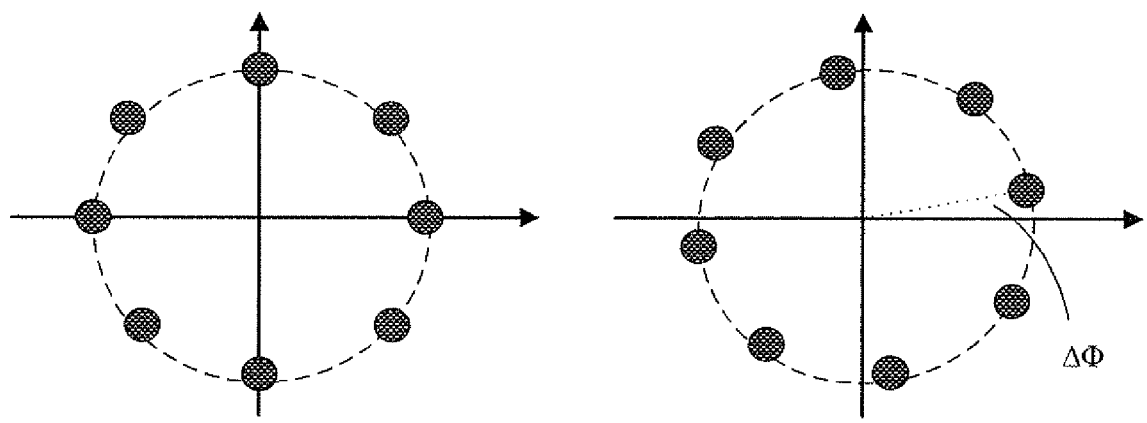
FIG. 9a and FIG. 9b are schematic diagrams respectively showing the possible phases of a D8QPSK constellation with and without frequency offset.
Figure 10A:
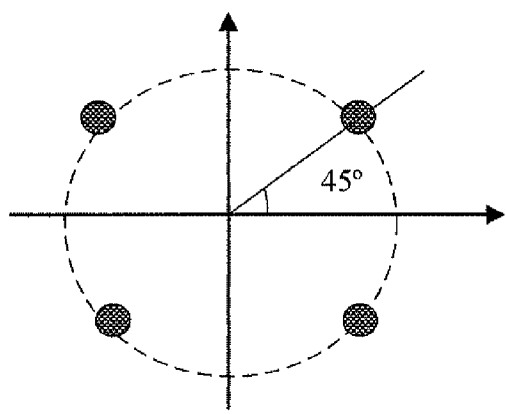
FIG. 10a and FIG. 10b are schematic diagrams respectively showing the possible phases of a pi/4 DQPSK constellation with and without frequency offset.
Figure 10B:
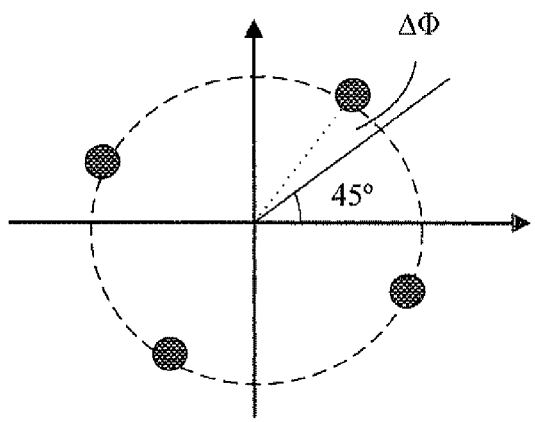
Figure 11A:
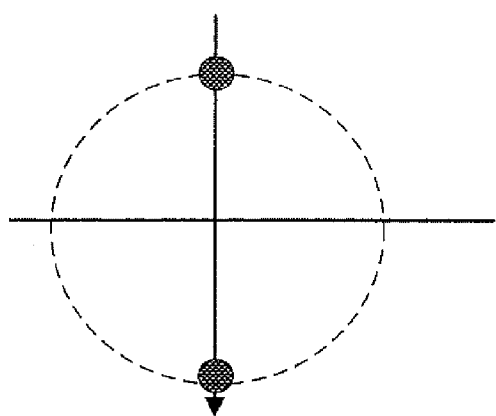
FIG. 11a and FIG. 11b are schematic diagrams respectively showing the possible phases of a pi/2 DBPSK constellation with and without frequency offset.
Figure 11B:
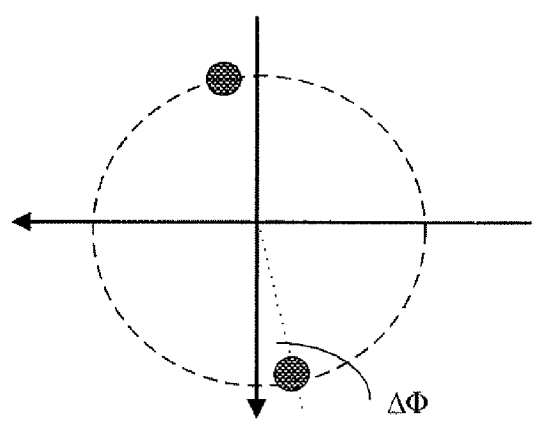

The main body inverse tangent (ATAN) function is implemented by the 6 bit output divider followed by a Look-Up Table (LUT) such as that shown in FIG. 8. Based on the sign (polarity) of the I and Q components and a comparison of the modulus of the I and Q components, the looked-up phase is extended to the full range [0, 2 pi]. The LUT of FIG. 8 is a simplified version of a 6-bit in-6-bit out LUT and is simplified by adding a portion of the input (for example 3 bits) to the output of the LUT (which is, for example, 3 bits). This is advantageous as it reduces complexity without a significant loss in accuracy.

The phase detector stage 10, the coarse frequency offset compensation stage 14 and the phase offset compensation stage 22 are three similar stages with only one adder inside. The difference between these stages is that phase detector stage 10 subtracts the previous input from the current input while the other two stages 14 and 22 subtract the coarse frequency offset or phase offset respectively from the current input value.

In a preferred embodiment, the frequency offset estimation stage 16 is a common stage for all modulation schemes capable of being handled by the apparatus, with small variations for the processing of different modulation schemes. The frequency offset estimation stage 16 is arranged to estimate the residual frequency offset after the coarse frequency offset correction has been performed on the differential detector output. The frequency offset estimation is converted to the phase estimation after differential detection. The differential detector output has a number of possible points in the constellation whether the modulation scheme used is DMPSK, MPSK or pi/n DMPSK. For example, FIGS. 9a, 9b, 10a, 10b, 11a and 11b illustrate the differential detector output signal constellation with and without frequency offset in a clear channel for D8PSK, pi/4 DQPSK and pi/2 DBPSK, respectively.

The fixed frequency offset Δf (in sample rate) is converted to the phase difference ΔΦ of the symbol from the standard constellation as follows:

$$\Delta\Phi = \Delta f/Fs$$

where, Fs is the symbol rate.

ΔΦ can be estimated with or without the help of the known data. Without the help of known data, the differential detector output is first hard decided and then the phase is calculated as follows.

$$\Delta\Phi = \sum_{n=0}^{N-1} F(\varphi(n), 3)$$

for D8PSK modulation;

$$\Delta\Phi = \sum_{n=0}^{N-1} F(\varphi(n) + PD45, 2)$$

for pi/4 DQPSK modulation; and $$\Delta\Phi = \sum_{n=0}^{N-1} F(\varphi(n) + PD90, 1)$$

for pi/2 DBPSK.

where, F(x,n) is a function that removes the n bits of the MSB of the 2's complementary data x, and PD is the phase in digital form (in the range [0,2pi] radians). F(x,n) naturally performs the hard decision and maintains the distance of the symbol from its hard decision point. 'n' is related to the number of points at the modulation constellation. A reliable ΔΦ may be obtained by averaging a number of estimations. The new actual frequency offset may be derived as:

$$f(n) = f(n-1) + \Delta\Phi * Fs$$

where f(n) denotes the coarse frequency offset. A more reliable frequency offset may be derived as f_average (n)=f_average(n)*(1−η)+f(n)*η, while, η is the forgetting factor and much smaller than 1.

Figure 12:
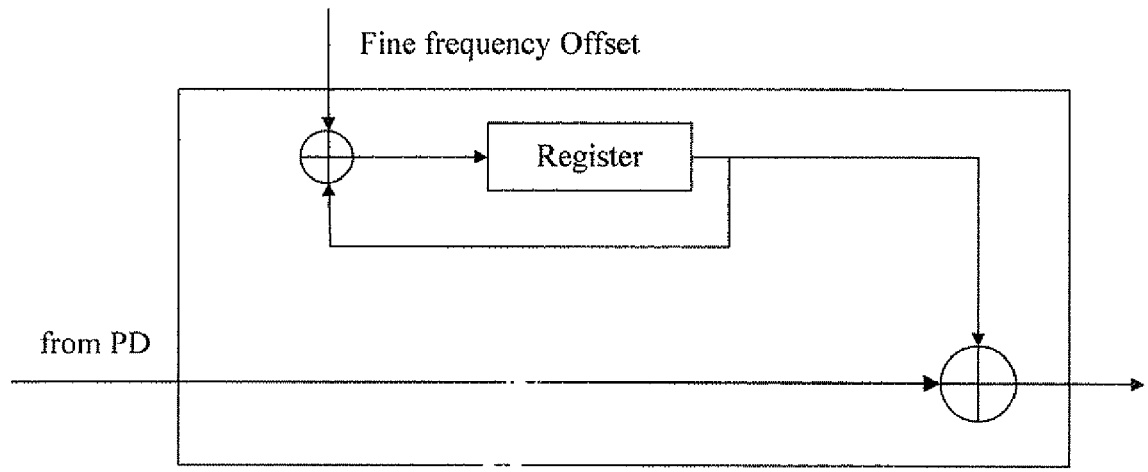
FIG. 12 is a block diagram of the fine frequency correction stage of FIG. 3.

The fine frequency offset correction may be carried out on the instantaneous phase. As shown in FIG. 12, an accumulator is used to accumulate the phase due to the existence of the frequency offset. This module is necessary for frequency offset estimation.

The phase offset estimation stage 24 assists coherent detection and tracks the residual phase offset after fine frequency offset correction. The phase offset estimation stage 24 comprises an initial phase offset estimation stage and a multiple phase offset estimation stage. The initial phase offset estimation is the first phase offset estimation and multiple phase offset estimations are required to track the phase offset.

The initial phase offset estimation is based on the change in the instantaneous phase due to fine frequency offset correction.

The first phase offset is given by:

$$\Theta(0) = \Phi 0;$$

$$\Theta(1)=\Phi 0+Dec(\Phi 1-\Phi 0)-\Phi 1;$$

$$\Theta(2)=\Phi 0+Dec(\Phi 1-\Phi 0)+Dec(\Phi 2-\Phi 1)-\Phi 2;$$

$$\Theta(3)=\Phi 0+Dec(\Phi 1-\Phi 0)+Dec(\Phi 2-\Phi 1)+Dec(\Phi 3-\Phi 2)-\Phi 3;$$

$$\Theta(4)=\Phi 0+Dec(\Phi 1-\Phi 0)+Dec(\Phi 2-\Phi 1)+Dec(\Phi 3-\Phi 2)+Dec(\Phi 4-\Phi 3)-\Phi 4;$$

...

$$\Theta(n)=\Phi 0+Dec(\Phi 1-\Phi 0)+Dec(\Phi 2-\Phi 1)+Dec(\Phi 3-\Phi 2)+\ldots+Dec(\Phi n-\Phi n-1)-\Phi n;$$

where, $Dec(\Phi n-\Phi n-1)$ is the hard decided phase difference between the nth phase and its previous one according to the modulation scheme. For example, $Dec(\Phi n-\Phi n-1)$ outputs four possible values, 45°, 135°, 225°, 315°.

The final initial phase offset is obtained by $$\Theta = \sum_{n=0}^{N-1} \Theta(n)$$

The multiple phase offset follows the fine frequency offset correction and phase correction stages 20, 22 and tracks the phase offset changes.

$$\Delta\Theta = \sum_{n=0}^{N-1} F(\varphi(n), 3)$$

for D8PSK where, $\phi(n)$ is the output of the Phase Offset Correction Block at the time n. The new phase offset is updated as $$\Theta(n)=\Theta(n-1)+\Delta\theta$$

The multiple phase offset may be performed based on a jumping window scheme. The window size should preferably be carefully selected to trade off the estimation accuracy with its tracking capacity. The other three stages, pi/4DQPSK/pi/2DBPSK De-map, MPSK De-map and DMPSK De-map, are arranged to determine the closest decision point in the relevant modulation constellation.

The above-described structure of FIG. 3 for demodulating signals modulated according to modulation schemes such as pi/4 DQPSK and pi/2 DQPSK may be easily modified to suit reception of a GMSK or GFSK signal which are used in GSM systems and low-rate Bluetooth systems. As the signal power is more compact and the phase difference between two symbols is limited to a small region, the performance may be expected to be very close to that achieved using a conventional analogue to digital conversion technique.

In a preferred embodiment, the apparatus may be arranged to process both signals modulated according to modulation schemes such as pi/4 DQPSK and pi/2 DQPSK as well as MPSK. In such an embodiment, the frequency offset estimation stage 16 which estimates and updates the existing frequency offset may also maintain the updates of the fine frequency compensation stage 20.

For the differential modulation systems where the transmitted symbol passes through the origin in the constellation, the nonlinearity introduced by the power amplifier, mixers, analogue band pass filter 2 and hard limiter 4 has a much more severe effect on performance. The differential detection following the limiter structure therefore requires good linearity in the analogue stages.

Figure 13:
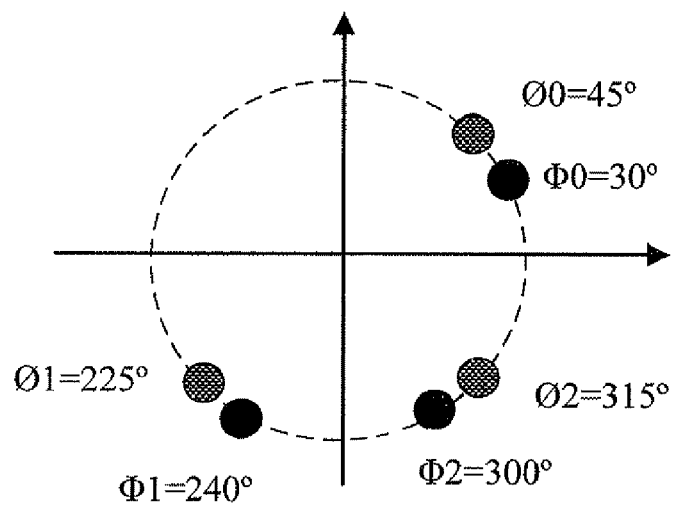
FIG. 13 is a schematic diagram showing examples of the phase constellation of DSPSK symbols after phase detection.

FIG. 13 shows a D8PSK signal where the transmitted symbols have phases of 45°, 225° and 315°. It will be seen that with instantaneous phase detection, distorted phases of 30°, 240° and 300° are obtained. The original phase differences are 180° and 90°, which correspond to the transmitted symbols 001 and 010, respectively. However, the distorted symbols from the IPD would be wrongly decided as 000 and 110, which correspond to phase differences of 210° and 60° between consecutive symbols. If coherent detection, according to a preferred embodiment of the invention is used to judge at which points the symbols reside, the instantaneous phases 30°, 240° and 300° will be judged initially as 45°, 225° and 315°, the differential detection based on the said judged phases giving the correct estimation.

One or more preferred embodiments of the present invention therefore provide an economical apparatus and method for demodulating one or more signals originally modulated according to one or more modulation schemes in which a reduction in performance degradation is achievable over conventional apparatus which replace analogue digital converter with a hard limiter.

Various modifications to the embodiments of the present invention described above may be made. For example, other components and method steps can be added or substituted for those above. Thus, although the invention has been described above using particular embodiments, many variations are possible within the scope of the claims, as will be clear to the skilled reader, without departing from the scope of the invention.

We claim:

1. An apparatus for demodulating a signal modulated according to any one or more of a pi/4DQPSK modulation scheme, a pi/2DBPSK modulation scheme, a GMSK modulation scheme, and a GFSK modulation scheme comprising:

a hard limiter stage for receiving an analogue input signal modulated with one or more symbols and for converting the input signal to a two level signal;

a digital down converter and low pass filter stage for receiving an output signal from the hard limiter stage and converting the signal to a base band signal;

a symbol synchronization stage for receiving an output signal from the digital down converter and low pass filter stage and for extracting symbol timing therefrom, the one or more symbols associated with the input signal each having an associated phase;

an instantaneous phase detector stage for receiving an output signal from the symbol synchronization stage and for calculating the instantaneous phase of the one or more symbols;

a differential detector for receiving an output signal from the instantaneous phase detector stage and for determining a difference in the phase between adjacent symbols;

a coarse frequency offset compensation stage for receiving an output signal from the differential detector stage and for applying a compensation signal to the output signal of the differential detector stage to compensate for the effects of frequency offset between a transmitter of the input signal and a receiver receiving the input signal applied to the apparatus;

a frequency offset estimation stage for receiving an output signal from the coarse frequency offset compensation stage and for estimating a residual frequency offset after application of the compensation signal, the frequency offset estimation stage being arranged to apply the estimated residual frequency offset to the coarse frequency offset compensation stage to update the frequency offset compensation signal; and a demapper stage for demodulating the output signal of the differential detector stage after compensation by the frequency offset compensation stage to generate a demodulated output signal.

2. An apparatus according to claim 1, wherein the digital down converter and low pass filter stage comprises a buffer, and the buffer is arranged to act as a signal delay prior to digital down conversion by the digital down converter and low pass filter stage.

3. An apparatus according to claim 1, wherein the symbol synchronization stage is arranged to apply a discrete Fast Fourier Transform process for extracting the symbol timing.

4. An apparatus according to claim 1, wherein the instantaneous phase detector stage is arranged to calculate the instantaneous phase of the one or more symbols based on inphase and quadrature components of the input signal.

5. An apparatus for demodulating a signal modulated according to a DMPSK or an MPSK modulation scheme comprising:

a hard limiter stage for receiving an analogue input signal modulated with one or more symbols and for converting the input signal to a two level signal;

a digital down converter and low pass filter stage for receiving an output signal from the hard limiter stage and converting the signal to a base band signal;

a symbol synchronization stage for receiving an output signal from the digital down converter and low pass filter stage and for extracting symbol timing therefrom, the one or more symbols associated with the input signal each having an associated phase;

an instantaneous phase detector stage for receiving an output signal from the symbol synchronization stage and for calculating the instantaneous phase of the one or more symbols;

a fine frequency offset compensation stage for receiving an output signal from the instantaneous detector stage and for applying a frequency compensation signal to the output signal of the instantaneous detector stage to compensate for the effects of frequency offset between a transmitter of the input signal and a receiver receiving the input signal applied to the apparatus;

a phase offset compensation stage for receiving an output signal from the fine frequency offset compensation stage and for applying a phase compensation signal to the frequency compensated signal;

a dynamic phase offset estimation stage for receiving an output signal from the phase offset compensation stage and being arranged to apply an estimated phase offset to the phase offset compensation stage to update the phase offset compensation signal; and a demapper stage for demodulating the signal after compensation by the frequency offset compensation stage and phase offset compensation stage to generate a demodulated output signal.

6. An apparatus for demodulating a signal modulated according to one or more of a pi/4DQPSK modulation scheme, a pi/2DBPSK modulation scheme, a GMSK modulation scheme, a GFSK modulation scheme, a DMPSK modulation scheme or an MPSK modulation scheme, comprising:

an apparatus for demodulating a signal modulated according to one or more of a pi/4DQPSK modulation scheme, a pi/2DBPSK modulation scheme, a GMSK modulation scheme, and a GFSK modulation scheme, including a hard limiter stage for receiving an analogue input signal modulated with one or more symbols and for converting the input signal to a two level signal, a digital down converter and low pass filter stage for receiving an output signal from the hard limiter stage and converting the signal to a base band signal, a symbol synchronization stage for receiving an output signal from the digital down converter and low pass filter stage and for extracting symbol timing therefrom, the one or more symbols associated with the input signal each having an associated phase, an instantaneous phase detector stage for receiving an output signal from the symbol synchronization stage and for calculating the instantaneous phase of the one or more symbols, a differential detector for receiving an output signal from the instantaneous phase detector stage and for determining a difference in the phase between adjacent symbols, a coarse frequency offset compensation stage for receiving an output signal from the differential detector stage and for applying a compensation signal to the output signal of the differential detector stage to compensate for the effects of frequency offset between a transmitter of the input signal and a receiver receiving the input signal applied to the apparatus, a frequency offset estimation stage for receiving an output signal from the coarse frequency offset compensation stage and for estimating a residual frequency offset after application of the compensation signal, the frequency offset estimation stage being arranged to apply the estimated residual frequency offset to the coarse frequency offset compensation stage to update the frequency offset compensation signal, and a demapper stage for demodulating the output signal of the differential detector stage after compensation by the frequency offset compensation stage to generate a demodulated output signal; and the apparatus of claim 5 for demodulating a signal modulated according to one or more of a DMPSK modulation scheme and an MPSK modulation scheme.

7. An apparatus according to claim 5, wherein the demapper stage comprises an MPSK demapper stage.

8. An apparatus for demodulating a signal modulated according to one or more of a pi/4DQPSK modulation scheme, a pi/2DBPSK modulation scheme, a GMSK modulation scheme, a GFSK modulation scheme, a DMPSK modulation scheme or an MPSK modulation scheme, comprising:

an apparatus for demodulating a signal modulated according to one or more of a pi/4DQPSK modulation scheme, a pi/2DBPSK modulation scheme, a GMSK modulation scheme, and a GFSK modulation scheme, including a hard limiter stage for receiving an analogue input signal modulated with one or more symbols and for converting the input signal to a two level signal, a digital down converter and low pass filter stage for receiving an output signal from the hard limiter stage and converting the signal to a base band signal, a symbol synchronization stage for receiving an output signal from the digital down converter and low pass filter stage and for extracting symbol timing therefrom, the one or more symbols associated with the input signal each having an associated phase, an instantaneous phase detector stage for receiving an output signal from the symbol synchronization stage and for calculating the instantaneous phase of the one or more symbols, a differential detector for receiving an output signal from the instantaneous phase detector stage and for determining a difference in the phase between adjacent symbols, a coarse frequency offset compensation stage for receiving an output signal from the differential detector stage and for applying a compensation signal to the output signal of the differential detector stage to compensate for the effects of frequency offset between a transmitter of the input signal and a receiver receiving the input signal applied to the apparatus, a frequency offset estimation stage for receiving an output signal from the coarse frequency offset compensation stage and for estimating a residual frequency offset after application of the compensation signal, the frequency offset estimation stage being arranged to apply the estimated residual frequency offset to the coarse frequency offset compensation stage to update the frequency offset compensation signal, and a demapper stage for demodulating the output signal of the differential detector stage after compensation by the frequency offset compensation stage to generate a demodulated output signal; and the apparatus of claim 7 for demodulating a signal modulated according to one or more of a DMPSK modulation scheme and an MPSK modulation scheme.

9. An apparatus according to claim 5, further comprising a DMPSK decoder stage for receiving an output signal from the demapper stage and arranged to decode the output signal according to a DMPSK demapping scheme if the input signal has been modulated according to a DMPSK modulation scheme.

10. An apparatus for demodulating a signal modulated according to one or more of a pi/4DQPSK modulation scheme, a pi/2DBPSK modulation scheme, a GMSK modulation scheme, a GFSK modulation scheme, a DMPSK modulation scheme or an MPSK modulation scheme, comprising:

an apparatus for demodulating a signal modulated according to one or more of a pi/4DQPSK modulation scheme, a pi/2DBPSK modulation scheme, a GMSK modulation scheme, and a GFSK modulation scheme, including a hard limiter stage for receiving an analogue input signal modulated with one or more symbols and for converting the input signal to a two level signal, a digital down converter and low pass filter stage for receiving an output signal from the hard limiter stage and converting the signal to a base band signal, a symbol synchronization stage for receiving an output signal from the digital down converter and low pass filter stage and for extracting symbol timing therefrom, the one or more symbols associated with the input signal each having an associated phase, an instantaneous phase detector stage for receiving an output signal from the symbol synchronization stage and for calculating the instantaneous phase of the one or more symbols, a differential detector for receiving an output signal from the instantaneous phase detector stage and for determining a difference in the phase between adjacent symbols, a coarse frequency offset compensation stage for receiving an output signal from the differential detector stage and for applying a compensation signal to the output signal of the differential detector stage to compensate for the effects of frequency offset between a transmitter of the input signal and a receiver receiving the input signal applied to the apparatus, a frequency offset estimation stage for receiving an output signal from the coarse frequency offset compensation stage and for estimating a residual frequency offset after application of the compensation signal, the frequency offset estimation stage being arranged to apply the estimated residual frequency offset to the coarse frequency offset compensation stage to update the frequency offset compensation signal, and a demapper stage for demodulating the output signal of the differential detector stage after compensation by the frequency offset compensation stage to generate a demodulated output signal; and the apparatus of claim 9 for demodulating a signal modulated according to one or more of a DMPSK modulation scheme and an MPSK modulation scheme.

11. A method for demodulating a signal modulated according to any one or more of a pi/4DQPSK modulation scheme, a pi/2DBPSK modulation scheme, a GMSK modulation scheme, and a GFSK modulation scheme comprising:

receiving an analogue input signal modulated with one or more symbols;

converting the input signal to a two level signal in a hard limiter stage;

applying an output signal from the hard limiter stage to a digital down converter and low pass filter stage and converting the signal to a base band signal;

applying an output signal from the digital down converter and low pass filter stage to a symbol synchronization stage and extracting symbol timing therefrom, the one or more symbols associated with the input signal each having an associated phase;

applying stage an output signal from the symbol synchronization stage to an instantaneous phase detector and calculating the instantaneous phase of the one or more symbols;

applying an output signal from the instantaneous phase detector stage a differential detector and determining a difference in the phase between adjacent symbols;

applying an output signal from the differential detector stage to a coarse frequency offset compensation stage arranged to generate and apply a compensation signal to the output signal of the differential detector stage to compensate for the effects of frequency offset between a transmitter of the input signal and a receiver receiving the input signal applied to the apparatus;

applying an output signal from the coarse frequency offset compensation stage to a frequency offset estimation stage and estimating using the frequency offset estimation stage a residual frequency offset after application of the compensation signal;

applying the estimated residual frequency offset to the coarse frequency offset compensation stage to update the frequency offset compensation signal; and demodulating in a demapper stage the output signal of the differential detector stage after compensation by the frequency offset compensation stage to generate a demodulated output signal.

12. A method according to claim 11, wherein the step of applying an output signal from the hard limiter stage to the digital down converter and low pass filter stage comprises delaying the signal in a buffer prior to digital down conversion by the digital down converter and low pass filter stage.

13. A method according to claim 11, wherein the step of calculating the instantaneous phase of the one or more symbols in the symbol synchronization stage comprises applying a discrete Fast Fourier Transform process for extracting the symbol timing.

14. A method according to claim 11, wherein the step of calculating the instantaneous phase of the one or more symbols comprises basing the calculation on inphase and quadrature components of the input signal.

15. A method for demodulating a signal modulated according to a DMPSK or an MPSK modulation scheme, the method comprising: receiving an analogue input signal modulated with one or more symbols;

converting the input signal to a two level signal using a hard limiter stage;

applying an output signal from the hard limiter stage to a digital down converter and low pass filter stage and converting the signal to a base band signal;

applying an output signal from the digital down converter and low pass filter stage to a symbol synchronization stage and extracting symbol timing therefrom, the one or more symbols associated with the input signal each having an associated phase;

applying an output signal from the symbol synchronization stage to an instantaneous phase detector stage and calculating the instantaneous phase of the one or more symbols;

applying an output signal from the instantaneous detector stage to a fine frequency offset compensation stage and applying a frequency compensation signal to the output signal of the instantaneous detector stage to compensate for the effects of frequency offset between a transmitter of the input signal and a receiver receiving the input signal applied to the apparatus;

applying an output signal from the fine frequency offset compensation stage to a phase offset compensation stage and applying a phase compensation signal to the frequency compensated signal;

applying an output signal from the phase offset compensation stage to a dynamic phase offset estimation stage and applying an estimated phase offset to the phase offset compensation stage to update the phase offset compensation signal; and demodulating in a demapper stage the signal after compensation by the frequency offset compensation stage and phase offset compensation stage to generate a demodulated output signal.

16. An apparatus for demodulating a signal modulated according to any one or more of a pi/4DQPSK modulation scheme, a pi/2DBPSK modulation scheme, a GMSK modulation scheme, a GFSK modulation scheme, a DMPSK modulation scheme or an MPSK modulation scheme comprising:

an apparatus arranged to apply the method of demodulating a signal modulated according to any one or more of a pi/4DQPSK modulation scheme, a pi/2DBPSK modulation scheme, a GMSK modulation scheme, and a GFSK modulation scheme, including receiving an analogue input signal modulated with one or more symbols, converting the input signal to a two level signal in a hard limiter stage, applying an output signal from the hard limiter stage to a digital down converter and low pass filter stage and converting the signal to a base band signal, applying an output signal from the digital down converter and low pass filter stage to a symbol synchronization stage and extracting symbol timing therefrom, the one or more symbols associated with the input signal each having an associated phase; applying stage an output signal from the symbol synchronization stage to an instantaneous phase detector and calculating the instantaneous phase of the one or more symbols, applying an output signal from the instantaneous phase detector stage a differential detector and determining a difference in the phase between adjacent symbols, applying an output signal from the differential detector stage to a coarse frequency offset compensation stage arranged to generate and apply a compensation signal to the output signal of the differential detector stage to compensate for the effects of frequency offset between a transmitter of the input signal and a receiver receiving the input signal applied to the apparatus, applying an output signal from the coarse frequency offset compensation stage to a frequency offset estimation stage and estimating using the frequency offset estimation stage a residual frequency offset after application of the compensation signal, applying the estimated residual frequency offset to the coarse frequency offset compensation stage to update the frequency offset compensation signal, and demodulating in a demapper stage the output signal of the differential detector stage after compensation by the frequency offset compensation stage to generate a demodulated output signal, for demodulating a signal modulated according to any one or more of a pi/4DQPSK modulation scheme, a pi/2DBPSK modulation scheme, a GMSK modulation scheme, and a GFSK modulation scheme; and an apparatus arranged to apply the method of claim 15 for demodulating a signal modulated according to any one or more of a DMPSK modulation scheme or an MPSK modulation scheme.

17. A method according to claim 11, wherein the step of demodulating comprises demodulating the signal in an MPSK demapper stage.

18. An apparatus for demodulating a signal modulated according to any one or more of a pi/4DQPSK modulation scheme, a pi/2DBPSK modulation scheme, a GMSK modulation scheme, a GFSK modulation scheme, a DMPSK modulation scheme or an MPSK modulation scheme comprising:

an apparatus arranged to apply the method of demodulating a signal modulated according to any one or more of a pi/4DQPSK modulation scheme, a pi/2DBPSK modulation scheme, a GMSK modulation scheme, and a GFSK modulation scheme, including receiving an analogue input signal modulated with one or more symbols, converting the input signal to a two level signal in a hard limiter stage, applying an output signal from the hard limiter stage to a digital down converter and low pass filter stage and converting the signal to a base band signal, applying an output signal from the digital down converter and low pass filter stage to a symbol synchronization stage and extracting symbol timing therefrom, the one or more symbols associated with the input signal each having an associated phase;

applying stage an output signal from the symbol synchronization stage to an instantaneous phase detector and calculating the instantaneous phase of the one or more symbols, applying an output signal from the instantaneous phase detector stage a differential detector and determining a difference in the phase between adjacent symbols, applying an output signal from the differential detector stage to a coarse frequency offset compensation stage arranged to generate and apply a compensation signal to the output signal of the differential detector stage to compensate for the effects of frequency offset between a transmitter of the input signal and a receiver receiving the input signal applied to the apparatus, applying an output signal from the coarse frequency offset compensation stage to a frequency offset estimation stage and estimating using the frequency offset estimation stage a residual frequency offset after application of the compensation signal, applying the estimated residual frequency offset to the coarse frequency offset compensation stage to update the frequency offset compensation signal, and demodulating in a demapper stage the output signal of the differential detector stage after compensation by the frequency offset compensation stage to generate a demodulated output signal, for demodulating a signal modulated according to any one or more of a pi/4DQPSK modulation scheme, a pi/2DBPSK modulation scheme, a GMSK modulation scheme, and a GFSK modulation scheme; and an apparatus arranged to apply the method of claim 17 for demodulating a signal modulated according to any one or more of a DMPSK modulation scheme or an MPSK modulation scheme.

19. A method according to claim 11, further comprising applying an output signal from the demapper stage to a DMPSK decoder stage and decoding the output signal according to a DMPSK demapping scheme if the input signal has been modulated according to a DMPSK modulation scheme.

20. An apparatus for demodulating a signal modulated according to any one or more of a pi/4DQPSK modulation scheme, a pi/2DBPSK modulation scheme, a GMSK modulation scheme, a GFSK modulation scheme, a DMPSK modulation scheme or an MPSK modulation scheme comprising:

an apparatus arranged to apply the method of demodulating a signal modulated according to any one or more of a pi/4DQPSK modulation scheme, a pi/2DBPSK modulation scheme, a GMSK modulation scheme, and a GFSK modulation scheme, including receiving an analogue input signal modulated with one or more symbols, converting the input signal to a two level signal in a hard limiter stage, applying an output signal from the hard limiter stage to a digital down converter and low pass filter stage and converting the signal to a base band signal, applying an output signal from the digital down converter and low pass filter stage to a symbol synchronization stage and extracting symbol timing therefrom, the one or more symbols associated with the input signal each having an associated phase; applying stage an output signal from the symbol synchronization stage to an instantaneous phase detector and calculating the instantaneous phase of the one or more symbols, applying an output signal from the instantaneous phase detector stage a differential detector and determining a difference in the phase between adjacent symbols, applying an output signal from the differential detector stage to a coarse frequency offset compensation stage arranged to generate and apply a compensation signal to the output signal of the differential detector stage to compensate for the effects of frequency offset between a transmitter of the input signal and a receiver receiving the input signal applied to the apparatus, applying an output signal from the coarse frequency offset compensation stage to a frequency offset estimation stage and estimating using the frequency offset estimation stage a residual frequency offset after application of the compensation signal, applying the estimated residual frequency offset to the coarse frequency offset compensation stage to update the frequency offset compensation signal, and demodulating in a demapper stage the output signal of the differential detector stage after compensation by the frequency offset compensation stage to generate a demodulated output signal, for demodulating a signal modulated according to any one or more of a pi/4DQPSK modulation scheme, a pi/2DBPSK modulation scheme, a GMSK modulation scheme, and a GFSK modulation scheme; and an apparatus arranged to apply the method of claim 19 for demodulating a signal modulated according to any one or more of a DMPSK modulation scheme or an MPSK modulation scheme.

* * * * *